Patented Feb. 28, 1939

2,148,909

UNITED STATES PATENT OFFICE 2,148,909

MANUFACTURE OF THIAZOLIDINE DERIVATIVES

Walter Maier, Jessnitz in Anhalt, Germany, assignor to I. G. Farbenindustrie Aktiengesellschaft, Frankfort-on-the-Main, Germany No Drawing. Application June 2, 1936, Serial No. 83,167. In Germany June 8, 1935

19 Claims. (Cl. 260—302)

My present invention relates to the manufacture of thiazolidine derivatives.

One of its objects is a process of manufacturing new thiazolidine derivatives. Other objects are the new thiazolidine derivatives. Further objects will be seen from the detailed specification following hereafter.

It is known to convert carbon bisulfide, phenylated mustard oil and thioacetamide into thiazoline derivatives by interaction with cyclic imines.

According to this invention it has been found that under certain conditions xanthogenates or the corresponding xanthogenic acids may be reacted with cyclic imines, however, the nature of the reaction is different from that above specified because there are not obtained products of the type of unsaturated thiazolines but compounds of the type of the saturated thiazolidine. These products contain a mercapto group which is easily capable of further reaction. The products which are produced by the interaction of one molecular proportion of ethylene imine and one molecular proportion of xanthogenate or of the corresponding xanthogenic acid are on account of their properties and the analyses made from these products probably 2-mercapto-thiazolidines at the 2-position of which there is linked in ether-like linking the radical of the used xanthogenate:

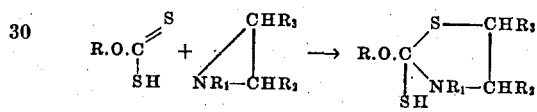

wherein R stands for a substituted or unsubstituted, saturated or unsaturated aliphatic, aromatic, hydroaromatic or heterocyclic radical and $R_1$ stands for H or a substituted or unsubstituted, saturated or unsaturated aliphatic, aromatic, hydroaromatic or heterocyclic radical, and $R_2$ and $R_3$ stand for H or halogen, carboxyl, a sulfo group, alkyl, acyl, cycloalkyl, aryl or aralkyl.

If there are used for the reaction two or more molecular proportions of cyclic imine, there are obtained under certain conditions compounds which on one molecular proportion of xanthogenate contain 2 molecular proportions of cyclic imine. The second molecular proportion of cyclic imine has probably entered the molecule of the mercapto thiazolidine ether built in a first reaction from the xanthogenate and the first molecule of the cyclic imine in form of an aminoalkyl radical which is probably linked to the nitrogen atom of the thiazolidine nucleus because the reaction of the mercapto thiazolidine ether with 1 molecular proportion of cyclic imine leads to compounds which have the same properties and the analysis of which leads to the same result.

In general the reaction of 1 molecular proportion of xanthogenate with 1 molecular proportion of cyclic imine gives the best yield of mercapto thiazolidine ether if 1 molecular proportion of xanthogenate is reacted with 1 molecular proportion of cyclic imine and 1 molecular proportion of an optional acid (formation of a salt of the cyclic imine). If 1 molecular proportion of xanthogenate is reacted with 2 molecular proportions of cyclic imine, the best yield will be obtained if 1 molecular proportion of xanthogenate is reacted with 2 molecular proportions of cyclic imine and 1 molecular proportion of an optional acid. The same compounds are also obtained in a reaction with two separate stages if at first 1 molecular proportion of xanthogenate is reacted with 1 molecular proportion of imine and the resulting mercapto thiazolidine ether if desired after isolation is reacted with a further molecular proportion of a cyclic imine whereby the best yield will be obtained when the imine is applied as the free base.

With other conditions of alkalinity or acidity the reaction likewise sets in, however, mostly a considerable reduction of the yield with relation to the expected compound occurs. This is essentially the case if a strong acid or a strong base is present in a greater excess whereby the term "strong base" includes besides alkalis also, for instance, an excess of cyclic imine.

Instead of the pure cyclic imine there may also be used solutions which lead to the production of the imine and contain besides the imine for instance common salt, that is to say raw solutions of technical purity containing imine. Furthermore it has been found that the conversion of the xanthogenates under certain conditions may be performed directly with the starting materials from which the cyclic imines are produced such as halogenalkylamines or aminoalkylol sulfo esters of the formula

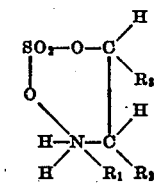

in which $R_1$, $R_2$ and $R_3$ stand for the same radicals as those specified for the formula on page 1, and the like compounds. Attention must be paid in this case to the above lines of direction according to which for a good yield one molecular proportion of free cyclic imine base has to be replaced by one molecular proportion of the corresponding halogenalkylamine base plus one molecular proportion of NaOH or by one molecular proportion of an aminoalkylol sulfo ester plus 2 molecular proportions of NaOH.

The temperature of the reaction is selected in accordance with the sensitiveness of the xanthogenate against temperature and in accordance with the properties of the nuclear imine or the halogenalkylamine which is brought to reaction. Generally it can be said that the imines react already at ordinary temperature very quickly. The chloralkylamines react sufficiently quick at a temperature of 40° C. and higher up to 100° C. or even higher according to the used solvent whereas the bromalkylamines as to their reactivity lie between the imines and the chloralkylamines. Of course the duration of the reaction and the temperature at which the reaction is carried out may be varied with respect to each other.

The reaction is preferably carried out in aqueous or alcoholic solution or with the use of a mixture of water and alcohol as a solvent, whereby, if a rexanthogenation shall be avoided, the used alcohol must be the same as that which is the basis of the applied xanthogenate. As cyclic imines there are suitable besides ethylene-imine and its products of substitution such as ethylene-imine-2-carboxylic acid, ethylene-imine sulfonic acid, furthermore C-alkyl-, acyl-, cycloalkyl-, aryl-, or aralkyl products of substitution such as N-methylethylene-imine, 2-3-diacetyl-ethylene-imine, 2-octadecylethylene-imine, N-cyclohexanolethylene-imine, 2-phenylethylene-imine, N-propyl-2-vinyl-ethylene-imine and analogous products of substitution.

As halogenalkylamines there may be used all 1-2-halogenalkylamines and their products of substitution of the above mentioned kind, whereby the position 1-2- indicates only the neighborhood of the halogen and the amino group and not exclusively the terminal position, for instance, bromethylamine, N-methyl-bromethylamine, chlorpropylamine-1-2-, chlorpropylamine-2-1, brombutylamine-2-3 and N-butylchlorethylamine. Dichlordiethylamine, N-diethylchlorethylamine, N-vinyl-2-octadecycl-chlorethylamine, trijodtriethylamine, N-diethylchlorethylamine and other halogenamines may be used to introduce an alkylamine radical into the thiazolidine. Instead of the halogenesters it is also possible to use the sulfoesters or others esters, for instance ethanolaminesulfoesters.

Principally any xanthogenate may be used for the reaction, for instance methylxanthogenate, butylxanthogenate, octadecyl-xanthogenate, oleylxanthogenate, polyvinylxanthogenate, benzylxanthogenate, bornylxanthogenate, xanthogenates of sugars, xanthogenates of starch, cellulose xanthogenates and the like. As the metal component the most various metals enter into consideration, for instance, sodium, barium, copper and so on.

The new compounds are thickly liquid oils to solid masses. The lower members of the class may be used as intermediate products and the higher members may be used for the production of nitrogen or sulfur containing artificial masses.

The following examples serve to illustrate the invention:

*Example 1.*—130 grams of methylxanthogenate are dissolved in 300 cc. of methanol and the solution is mixed with one of 53 cc. of ethylene-imine and 62 cc. of glacial acetic acid in 300 cc. of water. With development of heat there separates immediately a heavy oil, the quantity of which is somewhat increased after cooling. This bright yellow oil, after it has been freed by heating from methanol and water is recognized by reaction and analysis as being 2-mercapto-thiazolidine-2-methyl ether corresponding with the following formula

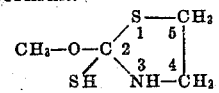

By boiling the alkaline solution of the oil 2-mercaptothiazoline of the formula

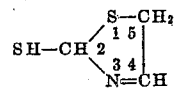

of melting point 170° C. is produced.

*Example 2.*—30 cc. of a methanolic solution of 0.1 mol. of methylxanthogenate are added to a mixture of 5.7 grams of N-methylethylene-imine, 30 cc. of water and 5 grams of sulfuric acid. Immediate development of heat occurs and a heavy, bright yellow oil separates which, in purified condition, gives analytical values corresponding with N-methyl-2-mercaptothiazolidine-2-methyl ether having the following formula

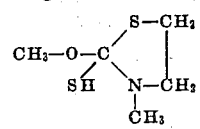

*Example 3.*—0.37 kilo of octadecylxanthogenate, dissolved in 5 liters of waters, are mixed with a solution of 0.1 kilo of ethylene-imine acetate in 1 liter of water. Immediate precipitation of the following compound follows:

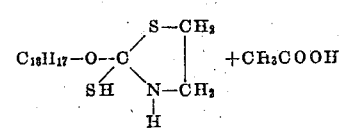

*Example 4.*—5 grams of bornylxanthogenate are dissolved in 100 cc. of water and the solution is mixed with an aqeous solution of ethylene-imine sulfate. There is immediately formed a precipitate of resinous behaviour which contains 4.5 per cent of nitrogen in a dry condition.

*Example 5.*—Unripened cellulose xanthogenate solution is stirred with water to form a thin liquid; it is then neutralized to phenolphthalein by means of acetic acid and there is added an aqueous solution of ethylene-imine acetate. There is immediately produced a white, flocculene precipitate of 2-mercaptothiazolidine-2-cellulose ether corresponding with the formula

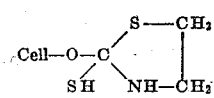

(Cell representing the cellulose molecule).

In the presence of about 40 xanthogenate residues per 100 cellulose $C_6$-molecules in the viscose there is produced a cellulose product having about 2.5 per cent of nitrogen, and 12 per cent of sulfur.

*Example 6.*—33 parts of potato starch are dissolved in 100 cc. of water containing 8 grams of caustic soda, and after addition of 30 cc. of carbon bisulfide the whole is kneaded for 2 hours. After diluting with water up to 2 liters carbon dioxide is passed through the mass for the purpose of neutralizing the excess of alkali and then precipitation is procured by adding a solution of 20 cc. of ethylene-imine and 27 cc. of acetic acid in 300 cc. of water. The precipitate instantaneously produced contains 5 per cent of nitrogen after it has been rinsed with water, the water has been separated by means of hot acetone and the product has been dried. Such artificial masses may be dyed with acid dyestuffs.

*Example 7.*—22 grams of polyvinyl alcohol are made into a paste with a solution of 30 grams of caustic soda solution in 150 cc. of water, 76 cc. of carbon bisulfide are added and the whole is shaken mechanically for 8 hours. After addition of 500 cc. of water the whole is neutralized with about 180 cc. of acetic acid of 20 per cent strength, filtered from any separated sulfur which may be present and the clear solution is mixed with a solution of 30 cc. of ethyleneimine and 40 cc. of glacial acetic acid in 300 cc. of water. There is immediately precipitated a spongy mass containing about 6 per cent of nitrogen. The formula of the resultant compound may be assumed to be as follows:

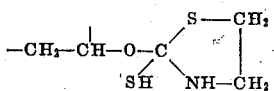

*Example 8.*—100 grams of potato starch are made into a paste by mixing them with 250 cc. of water, 65 grams of caustic potash and 90 cc. of carbon bisulfide for three hours. After dilution with 5 liters of water there are added 80 cc. of glacial acetic acid diluted with 600 cc. of water while cooling with ice and stirring. To the weekly acid solution of potassium xanthogenate there are added 40 cc. of pure ethylene-imine while continuously and thoroughly stirring. The product of reaction is immediately precipitated in form of a white tough mass.

*Example 9.*—205 grams of bromethylamine bromhydrate are dissolved in a solution of 40 grams of NaOH in 400 cc. of water, and to this solution there are added 130 grams of Na-methylxanthogenate dissolved in 300 cc. of methanol. This mixture is heated at 55° C. for 4 hours. After cooling the formed heavy oil is separated, washed with water and for purification freed from water and methanol by heating it in a vacuum at 80° C. for 2 hours. The result of the analysis of the oil indicates the compound to be a mercaptothiazolidine methylether, of the following formula produced by this reaction

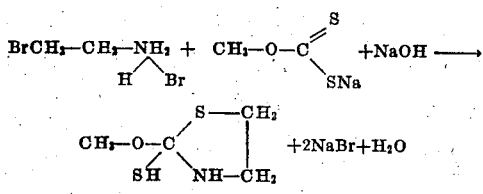

*Example 10.*—116 grams of chlorethylamine chlorhydrate are worked up as described in Example 9, however, while heating the mixture by means of a boiling water bath under reflux. The same oil is obtained as described in Example 9.

*Example 11.*—143 grams of N-ethylchlorethylamine chlorhydrate are worked up as described in Example 10 with the difference that 160 grams of K-ethylxanthogenate dissolved in 300 cc. of ethanol are used instead of the Na-methylxanthogenate. The oil which is obtained shows on analysis the values of the ethyl mercaptothiazolidine ethyl ether. The reaction occurs as follows:

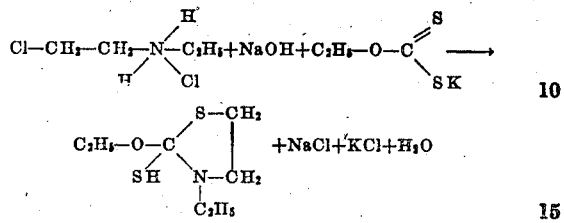

*Example 12.*—30 grams of potato starch are dissolved in 100 cc. of water containing 8 grams of NaOH and after addition of 30 cc. of carbon bisulfide heated for two hours. After the addition of 500 cc. of water dilute acetic acid is added for neutralization and then the thickly liquid mass is mixed with 1½ liter of water of 60° C. in which shortly before the addition there have been dissolved 205 grams of bromethylamine bromhydrate and 40 grams of NaOH. After a short period of time the product of reaction is precipitated in the form of flakes.

*Example 13.*—To a solution of 100 grams of sodiummethylxanthogenate dissolved in 300 cc. of methanol there is added a solution heated at 80° C. of 125 grams of aminoethanol sulfoester and 125 grams of NaOH in 500 cc. of water and the mixture is kept for 2 hours at 70–80° C. The thickly liquid oil which is precipitated on cooling and has a brownish color may be purified as described in Example 9. The product has the following formula:

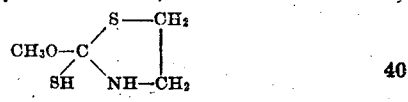

*Example 14.*—151 grams of mercaptothiazolidine methyl ether are dissolved in a mixture of 400 cc. of water, 400 cc. of methanol and 40 grams of NaOH at room temperature, and this solution is mixed with a solution of 205 grams of bromethylamine bromhydrate dissolved in 300 cc. of water which contains 40 grams of NaOH. After a one hour's heating at 40 to 50° C. the mixture is diluted with 500 cc. of water, and the formed heavy oil is separated by means of a separating funnel. By heating the oil for one hour at 80° C. in a vacuum the oil is freed from water and methanol. On cooling the oil assumes a tough condition. The analysis shows that one molecular proportion of mercaptothiazolidine methyl ether are united with one molecular proportion of the radical $C_2H_5N$.

*Example 15.*—151 grams of mercaptothiazolidine methyl ether are dissolved in 200 cc. of methanol and this solution is added to a solution of 116 grams of chlorethylamine chlorhydrate and 80 grams of NaOH in 400 cc. of water. The mixture is heated for 1 hour at 60° C., then there are added 500 cc. of water, and the oil which is formed on cooling is separated. The oil is purified as described in Example 14. The tough mass which is obtained is identical with the mass obtained according to Example 14. The analysis yields 14.2 per cent of N and 32.8 per cent of S whereas the calculation for $C_5H_{14}ON_2S_2$ yields 14.4 per cent of N and 33.0 per cent of S.

*Example 16.*—The reaction is the same as in Example 15, but with the difference that instead of 80 grams of NaOH there are used 160 grams of NaOH. After the reaction is finished, a solution of 45 cc. of sulfuric acid dissolved in 500 cc. of water is added and the oil which separates is worked up as described in the preceding example. The product shows the same values of analysis as the compound described in Example 15.

*Example 17.*—The reaction is the same as in Example 15, but with the difference that instead of 80 grams of NaOH there are used only 40 grams of NaOH. After the reaction is finished, a solution of 40 grams of NaOH in 500 cc. of water is added and the oil which has been formed is separated. The purified product contains 12.8 per cent of N and 35.7 per cent of S.

*Example 18.*—The reaction is exactly the same as in Example 15, however, with the difference that the addition of NaOH is completely omitted. After the reaction is finished, a solution of 80 grams of NaOH in 500 cc. of water is added and the formed oil is separated. The purified product contains 12.5 per cent of N and 37.4 per cent of S.

*Example 19.*—165 grams of mercaptothiazolidine ethyl ether are dissolved in 300 cc. of methanol and this solution is mixed with a solution of 130 grams of methylchlorethylamine chlorhydrate of the formula

and 80 grams of NaOH in 500 cc. of water. After a one hour's heating under reflux at 100° C. the mixture is diluted with 2 liters of water, cooled and the formed oil separated. After the usual working up a tough oil is obtained which contains 12.5 per cent of N and 28.4 per cent of S whereas the calculation for the compound $C_2H_{18}ON_2S_2$ yields 12.6 per cent of N and 28.8 per cent of S.

*Example 20.*—172 grams of diethylchlorethylamine chlorhydrate are dissolved in 300 cc. of methanol and this solution is mixed with a solution of 80 grams of NaOH in 400 cc. of water. To this mixture there is added a solution of 151 grams of mercaptothiazolidine methyl ether in 200 cc. of methanol, and the mixture is heated for 1 hour at 80° C. After the reaction is finished, there are added 2 liters of water, then the mixture is cooled and the oil which is separated is purified as usual. The analysis yields 10.9 per cent of N and 24.7 per cent of S, whereas the calculation for the compound $C_{10}H_{21}ON_2S_2$ yields 11.2 per cent of N and 25.6 per cent of S.

*Example 21.*—151 grams of mercaptothiazolidine methyl ether are dissolved in 200 cc. of methanol and mixed with a solution of 52 cc. of ethylene-imine in 200 cc. of water. After heating for 30 minutes at 60° C. under reflux, there are added 300 cc. of water and the mixture is cooled. The oil which is separated is washed with 300 cc. of water and freed from water and methanol by heating for 1 hour at 100° C. in a vacuum. The obtained mass which after cooling is tough contains 14.4 per cent of N.

*Example 22.*—151 grams of mercaptothiazolidine methyl ether are dissolved in a mixture of 400 cc. of water, 400 cc. of methanol and 40 grams of NaOH at 20° C. and this solution is mixed with a solution of 91 grams of methylethylene-imine acetate in 300 cc. of water. The mixture is allowed to stand over night at room temperature and is diluted with 500 cc. of water, and the formed oil is worked up as described above. There is obtained a tough oil containing 13.6 per cent of N and 30.6 per cent of S; the calculation for the compound $C_7H_{16}ON_2S_2$ yields 13.5 per cent of N and 30.8 per cent of S.

*Example 23.*—205 grams of bromethylamine bromhydrate dissolved in 600 grams of a 20 per cent solution of sodium hydroxide are mixed with a solution of 65 grams of methylxanthogenate in 200 cc. of methanol. After mixing, self-heating to about 40° C. occurs at which temperature the mixture is kept for a further six hours. After the addition of 500 cc. of water and cooling to 10° C. the separated heavy oil is removed and washed with cold water, and the oil is heated for 1 hour at 80° C. in a vacuum for removal of the dissolved water or methanol. The colorless mass which is tough when cold contains 14.2 per cent of N and 33.4 per cent of S whereas the compound $C_6H_{14}ON_2S_2$ contains 14.4 per cent of N and 33.0 per cent of S.

*Example 24.*—116 grams of chlorethylamine chlorhydrate dissolved in 800 grams of a 20 per cent solution of sodium hydroxide are mixed with a solution of 80 grams of methylxanthogenate in 200 cc. of methanal and the mixture is kept for 4 hours at 60–70° C. After the addition of 500 cc. of water, the oil which separates is worked up as described in Example 23. The tough oil contains 12.4 per cent of N and 36.2 per cent of S.

*Example 25.*—144 grams of ethylxanthogenate dissolved in 200 cc. of water are mixed with a solution of 43 grams of ethylene-imine, 261 grams of diethylbromethylamine bromhydrate and 120 grams of NaOH in 1000 cc. of water and heated to 60° C. After one hour the mixture is worked up as described in Example 23. The tough oil which is obtained contains 10.2 per cent of N and 25.7 per cent of S, whereas the compound $C_{11}H_{24}ON_2S_2$ contains 10.6 per cent of N and 24.2 per cent of S.

*Example 26.*—130 grams of methylxanthogenate dissolved in 200 cc. of methanol are mixed with a solution of 205 grams of bromethylamine bromhydrate and 80 grams of NaOH in 800 cc. of water and after a short time this mixture is mixed with a solution of 57 grams of methylethylene-imine in 200 cc. of water. The mixture which on account of the reaction which takes place has heated itself at 50° C. is kept at this temperature for further 30 minutes. The oil which has been formed is purified as usual. The oil which in its pure condition is tough contains 13.3 per cent of N and 31.0 per cent of S whereas the calculation for the compound $C_7H_{16}ON_2S_2$ yields 13.4 per cent of N and 30.8 per cent of S.

*Example 27.*—130 grams of methylxanthogenate dissolved in 310 cc. of methanol are mixed with a solution of 40 grams of ethylene-imine and 40 grams of methylethylene-imine in 200 cc. of methanol and heated for 4 hours at 40° C. under reflux. After the addition of 1000 cc. of water a heavy oil is precipitated which after the usual purification contains 10.7 per cent of N and 34.3 per cent of S.

*Example 28.*—65 grams of methylxanthogenate dissolved in 100 cc. of methanol are mixed with a solution of 50 cc. of ethylene-imine and 30 cc. of glacial acetic acid in 600 cc. of water. After a few seconds self-heating at a temperature of about 50° C. occurs while the liquid becomes turbid and an oil is separated. After the liquid has been kept for 10 minutes at this temperature, the oil is purified as usual. The tough mass which is obtained contains 14.4 per cent of N and 33.3 per cent of S, and is supposed to be identical with the mass obtained according to Example 23.

*Example 29.*—The mixture is the same as that described in Example 28, however with omission of the glacial acetic acid. The mixture is allowed to stand for 10 hours at room temperature, after which time an oil has been formed at the bottom of the vessel. After usual purification a clear tough oil containing 11.9 per cent of N and 34.2 per cent of S is obtained. The yield can be somewhat increased if, after the reaction is finished, the mixture is made acid by the addition of an optional acid.

What I claim is:

1. A process of producing a thiazolidine compound which comprises reacting on a xanthogenate with a cyclic ethyleneimine.

2. A process of producing a thiazolidine compound which comprises reacting on a xanthogenate with a cyclic ethyleneimine salt.

3. A process of producing a thiazolidine compound which comprises reacting on a xanthogenate with a raw solution containing a cyclic ethyleneimine.

4. A process of producing a thiazolidine compound which comprises reacting on a xanthogenate with a 1.2-halogen alkylamine.

5. A process of producing a thiazolidine compound which comprises reacting on a xanthogenate with a 1.2-halogen alkylamine and the equivalent amount of caustic alkali of said 1.2-halogen alkylamine.

6. A process of producing a thiazolidine compound which comprises reacting on one molecular proportion of xanthogenate with one molecular proportion of a cyclic ethyleneimine salt.

7. A process of producing a thiazolidine compound which comprises reacting on one molecular proportion of xanthogenate with one molecular proportion of a cyclic ethyleneimine salt and one molecular proportion of a cyclic ethyleneimine.

8. A process of producing a thiazolidine compound which comprises reacting on a xanthogenate with an imine selected from the group consisting of ethylene-imine, ethylene-imine-2-carboxylic acid, ethylene-imine-sulfonic acid, 2-3-diacetylethylene-imine, 2-octadecylethyleneimine, N-cyclohexanolethylene-imine, 2-phenylethylene-imine, N-propyl-2-vinyl-ethylene-imine.

9. A process of producing a thiazolidine compound which comprises reacting on a xanthogenate with one of the group consisting of bromethylamine, N-methyl-bromethylamine, chlorpropylamine-1-2, chlorpropylamine-2-1, brombutylamine-2-3, N-butylchlorethyleamine, dichlordiethylamine, and the corresponding sulfo esters.

10. A process of producing a thiazolidine compound which comprises reacting on a xanthogenate selected from the group consisting of methylxanthogenate, butylxanthogenate, octadecylxanthogenate, oleylxanthogenate, xanthogenates of sugars, xanthogenates of starch and cellulose xanthogenates with a cyclic ethyleneimine.

11. A process of producing a thiazolidine compound which comprises reacting on one molecular proportion of methylxanthogenate dissolved in methanol with a solution of one molecular proportion of ethylene-imine and the equivalent amount of glacial acetic acid.

12. A process of producing a thiazolidine compound which comprises reacting on one molecular proportion of bromethylamine bromhydrate and one molecular proportion of NaOH dissolved in water with one molecular proportion of Na-methylxanthogenate dissolved in methanol at 55° C.

13. A process of producing a thiazolidine compound which comprises reacting on one molecular proportion of methylxanthogenate dissolved in methanol with a solution of 2 molecular proportions of ethylene-imine and one molecular proportion of glacial acetic acid dissolved in water at 50° C.

14. 2-methoxy-2-mercaptothiazolidine having the formula

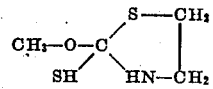

15. 2-methoxy-2-mercaptothiazolidine containing aminoethyl and produced by the process claimed in claim 7.

16. A process of producing a thiazolidine compound which comprises reacting on a xanthogenate with a sulfo ester of 1.2-alkylolamines.

17. A process of producing a thiazolidine compound which comprises reacting on a xanthogenate with a sulfo ester of 1.2-alkylolamines and the equivalent amount of caustic alkali of said ester of 1.2-alkylolamine.

18. A process of producing a thiazolidine compound which comprises reacting on a xanthogenate with a sulfoester of 1.2-alkylolamines.

19. A process of producing a thiazolidine compound which comprises reacting on a xanthogenate with a sulfoester of 1.2-alkylolamines and the equivalent amount of caustic alkali of said sulfoester of 1.2-alkylolamine.

WALTER MAIER.